United States Patent
Brandin

(12)
(10) Patent No.: US 6,324,636 B1
(45) Date of Patent: Nov. 27, 2001

(54) MEMORY MANAGEMENT SYSTEM AND METHOD

(75) Inventor: Christopher Lockton Brandin, Colorado Springs, CO (US)

(73) Assignee: NEO Core Inc, Colorado Springs, CO (US)

( * ) Notice: Subject to any disclaimer, the term of this patent is extended or adjusted under 35 U.S.C. 154(b) by 0 days.

(21) Appl. No.: 09/419,217

(22) Filed: Oct. 15, 1999

(51) Int. Cl.[7] ................................................. G06F 12/02
(52) U.S. Cl. ........................... 711/210; 711/108; 711/216
(58) Field of Search ................................. 711/216, 210, 711/108, 202; 707/2, 3, 6; 365/49

(56) References Cited

U.S. PATENT DOCUMENTS

| | | | | |
|---|---|---|---|---|
| 4,527,239 | * | 7/1985 | Brandin | 711/216 |
| 5,249,265 | * | 9/1993 | Liang | 345/356 |
| 5,287,499 | * | 2/1994 | Nemes | 707/2 |
| 5,339,398 | * | 8/1994 | Shah et al. | 711/216 |
| 5,414,704 | * | 5/1995 | Spinney | 370/389 |
| 5,717,916 | * | 2/1998 | Verma | 707/7 |

OTHER PUBLICATIONS

Schneider et al., "Concepts in Data Structures and Software Development", West Publishing Co., pp. 111, 115, 118–131, 137–145, and 314–329, 1991.*

* cited by examiner

*Primary Examiner*—Do Hyun Yoo
*Assistant Examiner*—Gary J. Portka
(74) *Attorney, Agent, or Firm*—Pale B. Halling

(57) ABSTRACT

The memory management system (20) includes a transform generator (22) capable of generating an address (28) and a confirmer (30) from a key. A controller (24) is connected to the transform generator (22) and sends the key to the transform generator (22) and receives the address (28) and the confirmer (30). A store (26) is connected to the controller (24) and has a plurality of addresses (28), each of the plurality of addresses (28) has a confirmer location (30), a forward pointer location (34), a primary flag (36), an allocated flag (38) and an association location (32).

36 Claims, 10 Drawing Sheets

50
Store

| Add. | 66 Confirmer | 52 FP | 56 Primary Flag | 60 Allocated Flag | 62 Association | 64 |
|---|---|---|---|---|---|---|
| 0 | 15 | 1 | 0 | 0 | |
| 1 | 0 | 2 | 0 | 0 | |
| 2 | 1 | 3 | 0 | 0 | |
| 3 | 2 | 4 | 0 | 0 | |
| 4 | 3 | 6 | 0 | 0 | |
| 5 | C1 | 5 | 1 | 1 | A1 |
| 6 | 4 | 7 | 0 | 0 | |
| 7 | 6 | 8 | 0 | 0 | |
| 8 | 7 | 9 | 0 | 0 | |
| 9 | 8 | 10 | 0 | 0 | |
| 10 | 9 | 11 | 0 | 0 | |
| 11 | 10 | 12 | 0 | 0 | |
| 12 | 11 | 13 | 0 | 0 | |
| 13 | 12 | 14 | 0 | 0 | |
| 14 | 13 | 15 | 0 | 0 | |
| 15 | 14 | 0 | 0 | 0 | |

FIG. 3

Store

| Add. (66) | Confirmer (52) | FP (56) | Primary Flag (60) | Allocated Flag (62) | Association (64) |
|---|---|---|---|---|---|
| 0 | 15 | 1 | 0 | 0 | |
| 1 | 0 | 2 | 0 | 0 | |
| 2 | 1 | 3 | 0 | 0 | |
| 3 | 2 | 4 | 0 | 0 | |
| 4 | 3 | 7 | 0 | 0 | |
| 5 | C1 | 6 | 1 | 1 | A1 |
| 6 | C2 | 5 | 0 | 1 | A2 |
| 7 | 4 | 8 | 0 | 0 | |
| 8 | 7 | 9 | 0 | 0 | |
| 9 | 8 | 10 | 0 | 0 | |
| 10 | 9 | 11 | 0 | 0 | |
| 11 | 10 | 12 | 0 | 0 | |
| 12 | 11 | 13 | 0 | 0 | |
| 13 | 12 | 14 | 0 | 0 | |
| 14 | 13 | 15 | 0 | 0 | |
| 15 | 14 | 0 | 0 | 0 | |

FIG. 4

50
Store

| Add. | Confirmer (52) | FP (56) | Primary Flag (60) | Allocated Flag (62) | Association (64) |
|---|---|---|---|---|---|
| 0 | 15 | 1 | 0 | 0 | |
| 1 | 0 | 2 | 0 | 0 | |
| 2 | 1 | 3 | 0 | 0 | |
| 3 | 2 | 4 | 0 | 0 | |
| 4 | 3 | 8 | 0 | 0 | |
| 5 | C1 | 7 | 1 | 1 | A1 |
| 6 | C3 | 6 | 1 | 1 | A3 |
| 7 | C2 | 5 | 0 | 1 | A2 |
| 8 | 4 | 9 | 0 | 0 | |
| 9 | 8 | 10 | 0 | 0 | |
| 10 | 9 | 11 | 0 | 0 | |
| 11 | 10 | 12 | 0 | 0 | |
| 12 | 11 | 13 | 0 | 0 | |
| 13 | 12 | 14 | 0 | 0 | |
| 14 | 13 | 15 | 0 | 0 | |
| 15 | 14 | 0 | 0 | 0 | |

FIG. 5

Store

| Add. 66 | Confirmer 52 | FP 56 | Primary Flag 60 | Allocated Flag 62 | Association 64 |
|---|---|---|---|---|---|
| 0 | 15 | 1 | | | |
| 1 | 0 | 2 | | | |
| 2 | 1 | 3 | | | |
| 3 | 2 | 4 | | | |
| 4 | 3 | 6 | | | |
| 5 | C1 | 7 | 1 | 1 | A1 |
| 6 | 4 | 8 | 0 | 0 | 0 |
| 7 | C2 | 5 | 0 | 1 | A2 |
| 8 | 6 | 9 | | | |
| 9 | 8 | 10 | | | |
| 10 | 9 | 11 | | | |
| 11 | 10 | 12 | | | |
| 12 | 11 | 13 | | | |
| 13 | 12 | 14 | | | |
| 14 | 13 | 15 | | | |
| 15 | 14 | 0 | | | |

FIG. 6

Store 50

| Add. /66 | Confirmer /52 | FP /56 | Primary Flag /60 | Allocated Flag /62 | Association /64 |
|---|---|---|---|---|---|
| 0 | 15 | 1 | | | |
| 1 | 0 | 2 | | | |
| 2 | 1 | 3 | | | |
| 3 | 2 | 4 | | | |
| 4 | 3 | 7 | | | |
| 5 | C1 | 5 | 1 | 1 | A1 |
| 6 | C3 | 6 | 1 | 1 | A3 |
| 7 | 4 | 8 | 0 | 0 | 0 |
| 8 | 7 | 9 | | | |
| 9 | 8 | 10 | | | |
| 10 | 9 | 11 | | | |
| 11 | 10 | 12 | | | |
| 12 | 11 | 13 | | | |
| 13 | 12 | 14 | | | |
| 14 | 13 | 15 | | | |
| 15 | 14 | 0 | | | |

FIG. 7

Store 50

| Add. (66) | Confirmer (52) | FP (56) | Primary Flag (60) | Allocated Flag (62) | Association (64) |
|---|---|---|---|---|---|
| 0 | 15 | 1 | 0 | 0 | |
| 1 | 0 | 2 | 0 | 0 | |
| 2 | 1 | 3 | 0 | 0 | |
| 3 | 2 | 4 | 0 | 0 | |
| 4 | 3 | 7 | 0 | 0 | |
| 5 | C2 | 5 | 1 | 1 | A2 |
| 6 | C3 | 6 | 1 | 1 | A3 |
| 7 | 4 | 8 | 0 | 0 | |
| 8 | 7 | 9 | 0 | 0 | |
| 9 | 8 | 10 | 0 | 0 | |
| 10 | 9 | 11 | 0 | 0 | |
| 11 | 10 | 12 | 0 | 0 | |
| 12 | 11 | 13 | 0 | 0 | |
| 13 | 12 | 14 | 0 | 0 | |
| 14 | 13 | 15 | 0 | 0 | |
| 15 | 14 | 0 | 0 | 0 | |

FIG. 8

MEMORY MANAGEMENT SYSTEM AND METHOD

FIELD OF THE INVENTION

The present invention relates generally to the field of computer memories and more particularly to a memory management system and method.

BACKGROUND OF THE INVENTION

Most computer memory today uses Random Access Memory (RAM) to store information. Each element of data has its own address. The Central Processing Unit (CPU) provides a singular address and can either read or write data at that location. This architecture is sequential in nature, requiring several processing steps to manipulate data because its location must be determined first.

An alternative method of managing data is with Content Addressable Memory (CAM). In this method the CPU provides a data element to the CAM and the CAM determines an address for the data element. CAMs are architecturally the inverse of RAMS. CAMs have typically been used in applications requiring high bandwidth and low latency requirements. CAMs provide significant improvements over alternative RAM-based search algorithms such as binary/tree searches or look-aside tag buffers. CAMs are hardware devices and as a result require the designer to determine the exact maximum key width and depth. Typical commercial CAM semiconductor chips are 64 bits wide and 1024 bits deep. As a result, applications requiring more than a few thousand entries are prohibitive in cost, power consumption and on-board real-estate.

Another data management scheme is associative memories. Typically associative memories use hash tables that return an arbitrary memory location for a data element. Hashing tables are commonly used in large database applications. Unfortunately, hashing tables suffer from a large number of collisions as the memory store approaches 70% full. The collision management requires external memory management schemes that require extra processing and memory space.

Thus there exists a need for a memory management system and method that overcomes these and other problems.

BRIEF DESCRIPTION OF THE DRAWINGS

FIG. 3 is a schematic diagram of a memory store in accordance with one embodiment of the invention;

FIG. 4 is a schematic diagram of a memory store in accordance with one embodiment of the invention;

FIG. 5 is a schematic diagram of a memory store in accordance with one embodiment of the invention;

FIG. 6 is a schematic diagram of a memory store in accordance with one embodiment of the invention;

FIG. 7 is a schematic diagram of a memory store in accordance with one embodiment of the invention;

FIG. 8 is a schematic diagram of a memory store in accordance with one embodiment of the invention;

DETAILED DESCRIPTION OF THE DRAWINGS

The memory management system includes a transform generator capable of generating an address and a confirmer from a key. A controller is connected to the transform generator and sends the key to the transform generator and receives the address and the confirmer. A store is connected to the controller and has a plurality of addresses. Each of the plurality of addresses has a confirmer location, a forward pointer location, a primary flag, an allocated flag and an association location. In one embodiment the transform generator is a linear feedback shift register (polynomial code). In another embodiment, the transform generator is Cyclical Redundancy Code (CRC) generator. A portion of the result from the generator is used as the address and a second portion is used as the confirmer. The memory management system described above provides fast lookup capabilities since the data element (key) determines the address of the association. In addition, the probability of collisions is very low or nonexistent. This means that extended linked lists do not have to be searched. The memory management system can be implemented in software or in hardware. As a result the number of entries and the width of the entries can be easily adjusted. The memory management system can handle from a few entries to tens of millions of entries with similar performance characteristics.

Figure 1:
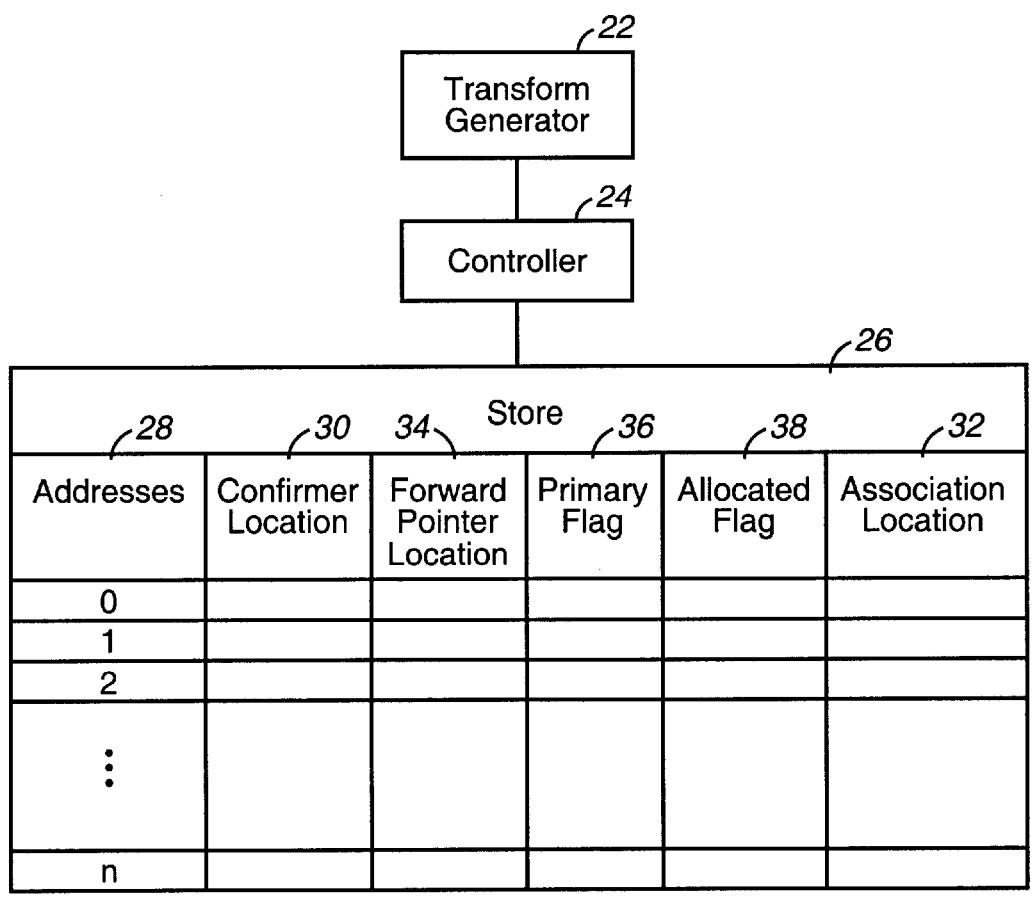
FIG. 1 is a block diagram of a memory management system in accordance with one embodiment of the invention.

FIG. 1 is a block diagram of a memory management system 20 in accordance with one embodiment of the invention. The memory management system 20 has three main elements: a transform generator 22; a controller 24 and a store (memory) 26. The transform generator determines an address 28 and a confirmer 30 from a key. The key is how the data is stored and looked up. For instance, a telephone information service would want a list of all the customer's names and telephone numbers. An operator would look up a telephone by a customer's name. The customer's name is the key and the telephone number may be the association.

The transform generator 22 receives the key and performs a mathematical process that returns the address 28 and confirmer 30. The address 28 and confirmer 30 together are called the icon or transform of the key. The ideal mathematical operation provides an even distribution of addresses even when the keys are not evenly distributed. In addition, the ideal mathematical operation does not result in a collision (same address and same confirmer) for different keys. Any mathematical operation that meets these criteria is acceptable. However, other mathematical operations may also be acceptable. One polynomial code that performs well against these criteria is (1E543279765927881).

The controller 24 stores or looks up an association 32 based on the address 28 and confirmer 30. The store 26 contains the confirmer location 30, a forward pointer location 34, a primary flag 36 and an allocated flag 38. A lookup command requires the controller to determine a first address (lookup address) and first confirmer (lookup confirmer) upon receiving a first key. The controller then determines if an allocated flag is set. When the allocated flag is set, the controller compares the first confirmer to a stored confirmer at the first address. When the stored confirmer and the first confirmer are the same the controller reads a stored association. The purpose of these locations will be explained in more detail with respect to FIGS. 2–8.

Figure 2:
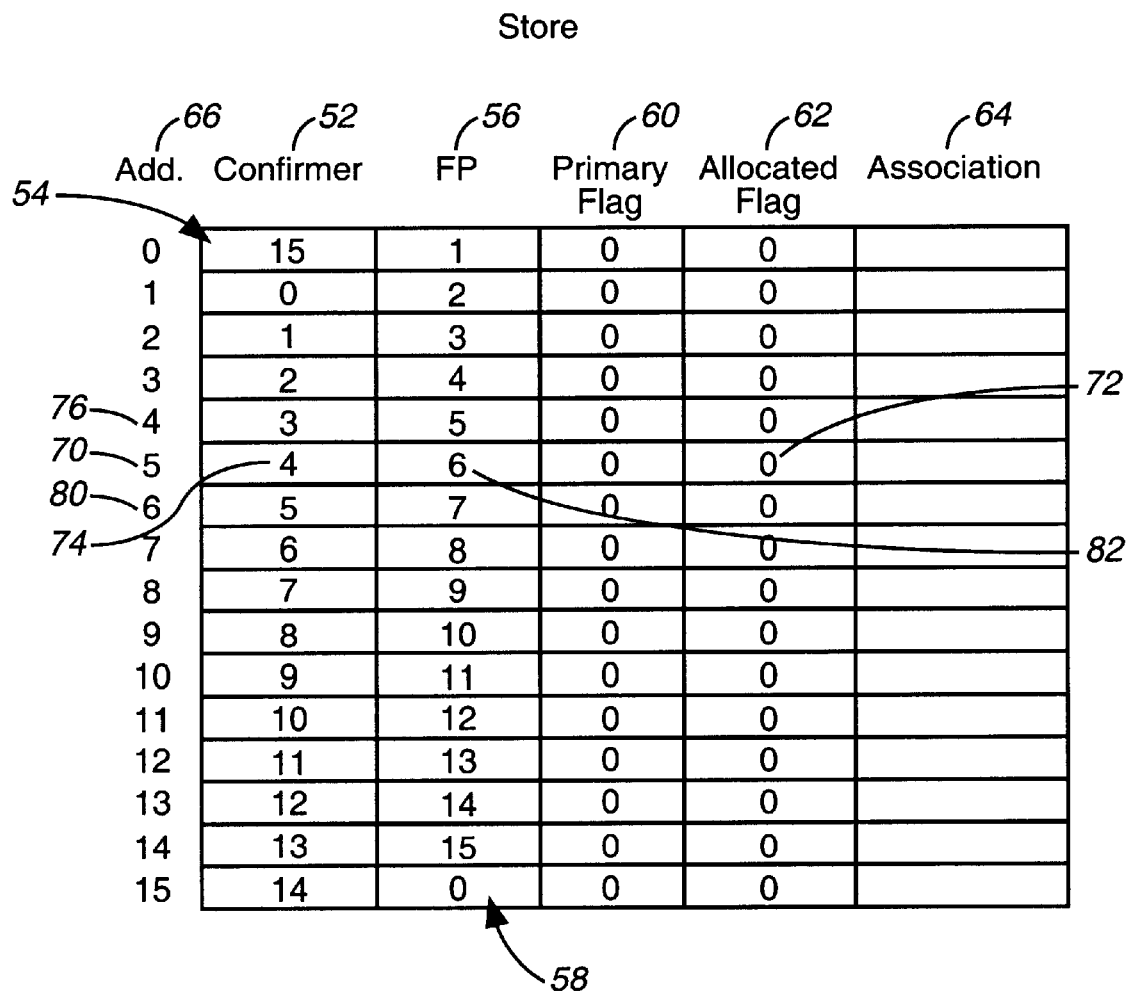
FIG. 2 is a schematic diagram of a memory store in accordance with one embodiment of the invention.

FIG. 2 is a schematic diagram of a memory store 50 in accordance with one embodiment of the invention. The store 50 shows an example with sixteen addresses. Generally, the number of address available will be based on a factor of two, for instance, 8, 16, 32, etc. The store 50 is merely a simple example to demonstrate how a store is initialized. In the example, the confirmer locations 52 contain a reverse pointer 54. The confirmer location 52 for address one is shown as zero. The forward pointer locations 56 each contain a forward pointer 58. The primary flag locations 60 are shown as zero's (unset). However, the primary flag locations 60 are free until an entry has been stored at the address. The allocated flag locations 62 are initialized to zero (unset). The association locations 64 are free and have no entries in this example. Note that an association is not required for the invention. In one embodiment the reverse pointer 54 is stored in a combination of free locations 52, 60, 64. The free locations upon initialization are the confirmer location 52, the primary flag location 60 and the association location 64.

The initialization process requires specifying a store 50 having a plurality of addresses 66. A confirm location 52 is defined for the each of the plurality of addresses 66. Next, a forward pointer location 56 for each of the addresses is defined. A forward address pointer 58 is entered for the forward pointer location for each of the plurality of addresses. The primary flag location 60 and allocated flag location 62 are defined for each of the addresses 66. An association location 64 is defined for each of the addresses. A reverse address pointer 54 is then entered in a free location for each of the addresses 66. As a result we have a doubly linked free list (forward and reverse pointers).

FIG. 3 is a schematic diagram of a memory store 50 in accordance with one embodiment of the invention. The figure illustrates a store at address five 70 assuming an initial state shown in FIG. 2. When the controller receives a store request, it sends a key to the transform generator. The transform generator returns an address (store address) and a confirmer (store confirmer). The controller then proceeds to store an association and confirmer at the address. The storing process requires that the controller first determines if the allocate flag 62 is set at the one of the plurality of address returned by the transform generator. When the allocated flag is not set, the controller moves to a reverse address indicated by the reverse pointer address. In the figures we see that the allocated flag 72 is not set for address five (first address) 70 in FIG. 2. As a result we can store an association at address five 70. The reverse address pointer 74 at address five 70 is address four 76. Thus we move to address four (reverse address) 76 and update the forward pointer at address four 76 to equal the forward pointer at address five 70. Thus we see that the forward pointer 78 (FIG. 3) at address four 76 is six. Address six is the next (forward) free address. Next the controller moves to the forward address 80 pointed to by the forward pointer 82 at the address five 70 (See FIG. 2). At address six (forward address) 80 we set the reverse pointer 84 equal to the reverse pointer 74 at address five 70. Next the confirmer (C1, first confirmer) 86 is entered at confirmer location 52 for the address five 70. The forward pointer 88 is set to point to address five. When there are no collisions, the forward pointer of a used address points to itself. The primary flag 90 and the allocated flag 92 are set. The association (A1) 94 is stored in the association location for address five. The store 50 of FIG. 3 shows an example of the state of store 50 after a store operation at address five.

FIG. 4 is a schematic diagram of a memory store 50 in accordance with one embodiment of the invention. FIG. 4 shows the state of store 50 after a collision store at address five. FIG. 4 assumes that the initial state of the store 50 before the collision store is shown in FIG. 3. Note that collisions are extremely rare when the appropriate polynomial code is selected. However, collisions cannot be ruled out in all cases. The controller receives a key and association for store. The transform generator returns an address of five. The controller checks if the allocated flag 92 is set at address five 70. When the allocated flag 92 is set, the controller determines if the primary flag 90 is set. When the primary flag 90 is set, the controller moves to a next free address. The next address can be found by forward searching or backwards searching. FIG. 4 shows an example where forward searching is used. The controller moves to the next address (second address) 80 and determines if the allocated flag is set. When the allocated flag is not set, then the address is the next free address. The next free address 80 is address six. The forward pointer 88 at address five is set to address six. The forward pointer 78 at address four is updated to equal the forward pointer at address six 80 (i.e., seven). The reverse pointer 100 at address seven 102 is set equal to reverse pointer 84 at address six 80. The confirmer (C2, second confirmer) 104 can then be stored at address six 60. The forward pointer 106 is set equal to five. The allocated flag 108 is set and the association (A2) 110 is stored.

FIG. 5 is a schematic diagram of a memory store 50 in accordance with one embodiment of the invention. FIG. 5 shows the state the store 50 after "secondary collision" store at address six assuming that FIG. 4 represents the initial condition of the store 50. The controller receives a key and an association for store. The transform generator returns the address six 80. The controller checks the allocated flag 108 (FIG. 4) and determines that address six 80 is allocated. The controller then checks the primary flag 60 at address six 80 and determines that the primary flag is not set. This tells the controller that the store at address six 80 is a collision store, not a primary store. The controller finds a free address (i.e, address seven 102). A free address is an address in which the allocated flag 62 is not set. The information stored at address six 80 (FIG. 80) needs to be moved to address seven 102. First the reverse pointer 120 at address eight 122 has to be updated to equal the reverse pointer at address seven 102 (FIG. 4). Next the forward pointer 78 at address four 76 has to be updated to be equal to the forward pointer at address seven 102 (FIG. 4). The contents (first confirmer, assocition) of address six 80 (FIG. 4) can now be moved to address seven 102. The confirmer (C3) 124 and the association (A3) 126 are stored at address six 80. The forward pointer at address six 80 is update to be address six. The primary flag and the allocated flag are set at address six. The forward pointer of address five 70 is updated to read address seven 102.

FIG. 6 is a schematic diagram of a memory store 50 in accordance with one embodiment of the invention. FIG. 6 shows the state of the store 50 after a delete of the entry at address six assuming that FIG. 5 shows the initial state of the store. The controller receives a delete command and a key. The transform generator determines a delete address (address six) and delete confirmer. The controller compares the delete confirmer to the stored confirmer (C3) at address six 80. When the stored confirmer (C3) is the same as the delete confirmer, the stored confirmer 124 and the stored association 126 are deleted. Next the allocated flag 130 and the primary flag 132 are unset. The controller searches for a next free address. In this case the next free address is address eight 122. The forward pointer 88 at the delete address 80 (address six) is updated to the next free address 122. Note that this example uses a forward search for a free address, however a reverse search is possible as will be apparent to those skilled in the art. The reverse address pointer 134 at the delete address 80 is set equal to the reverse address at the next free address 122. The reverse address 136 at the next free address 122 is set equal to the delete address (i.e, address six). The previous free address is found using the reverse address 120 (FIG. 5) at the next free address 122. The forward pointer 138 at the previous free address is updated to equal the delete address 80. The doubly linked free list now completely updated.

FIG. 7 is a schematic diagram of a memory store 50 in accordance with one embodiment of the invention. FIG. 7 shows the state of the store 50 after a delete of the entry at address seven 102 assuming that FIG. 5 shows the initial state of the store. The controller receives a delete command and a key. The transform generator determines a delete address (address seven) and delete confirmer. The controller compares the delete confirmer to the stored confirmer (C2) at address seven 102. When the stored confirmer (C2) is the same as the delete confirmer, the stored confirmer 104 and the stored association (A2) are deleted. Next the allocated flag 140 is unset. The controller searches for a next free address (i.e., address eight 122). The controller then updates the reverse pointer 142 for the free address to equal the reverse pointer 120 at the next free address 122. The controller then updates the forward pointer 144 at the delete address to equal the next free address. The reverse pointer 146 of the next free address 122 is updated to equal the delete address. A reverse address (address four 76) has its forward address 148 updated to equal the delete address. The delete operation is complete.

FIG. 8 is a schematic diagram of a memory store 50 in accordance with one embodiment of the invention. FIG. 8 shows the state of the store 50 after a delete of the entry at address five 70 assuming that FIG. 5 shows the initial state of the store. The controller receives a delete command and a key. The transform generator determines a delete address (address five) and delete confirmer. The controller compares the delete confirmer to the stored confirmer (C1) at address five 70. When the stored confirmer (C1) is the same as the delete confirmer, the controller determines if the forward pointer 78 points to the delete address 70. When the forward pointer 78, does not point to the delete address (itself), then the controller moves the confirmer (C2) and association (A2) at the forward pointer address 102 to the delete address 70. The forward pointer 150 at the delete address 70 is updated to equal the delete address 70. A reverse pointer 152 at the forward pointer address 102 is updated using the next free address 122 reverse pointer 120. The forward pointer 154 at the forward pointer address 102 is set equal to the next free address 122. The forward pointer 156 at the reverse address 76 is set equal to the forward pointer address 102. The delete operation for a primary entry having a collision is now complete.

Thus there has been described a method of operating a memory management system that can be implemented in hardware or software and allows deletes of entries in an associative memory. The method and system provide a simple method of handling collisions that does not require extensive linked lists. This accomplished while providing the extremely fast lookup times of a CAM memory system. In addition, the system is very flexible and capable of handling from two entries to over a million entries, without significant performance degradation.

Figure 9:
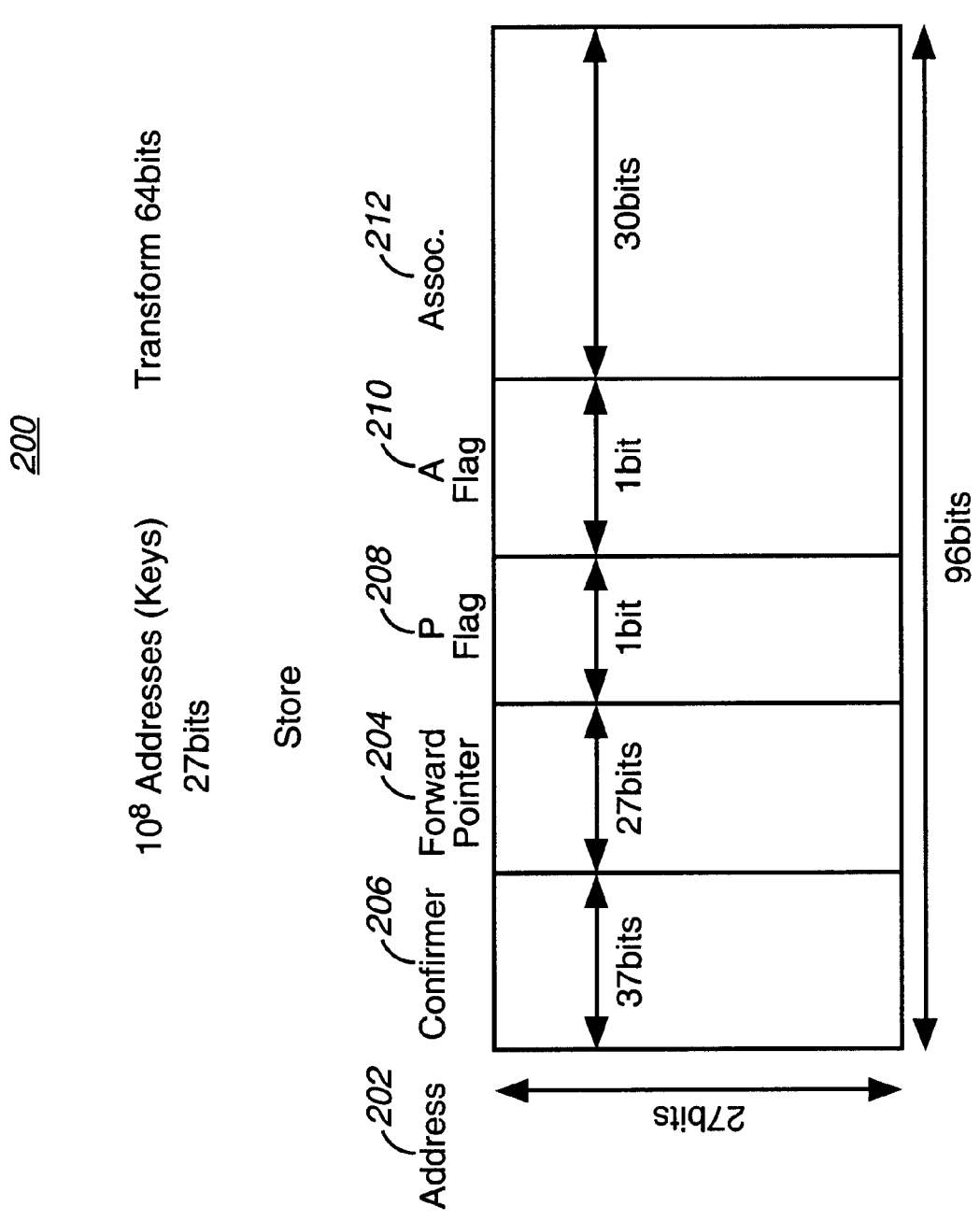
FIG. 9 is a schematic diagram of a memory store in accordance with one embodiment of the invention.
Figure 10:
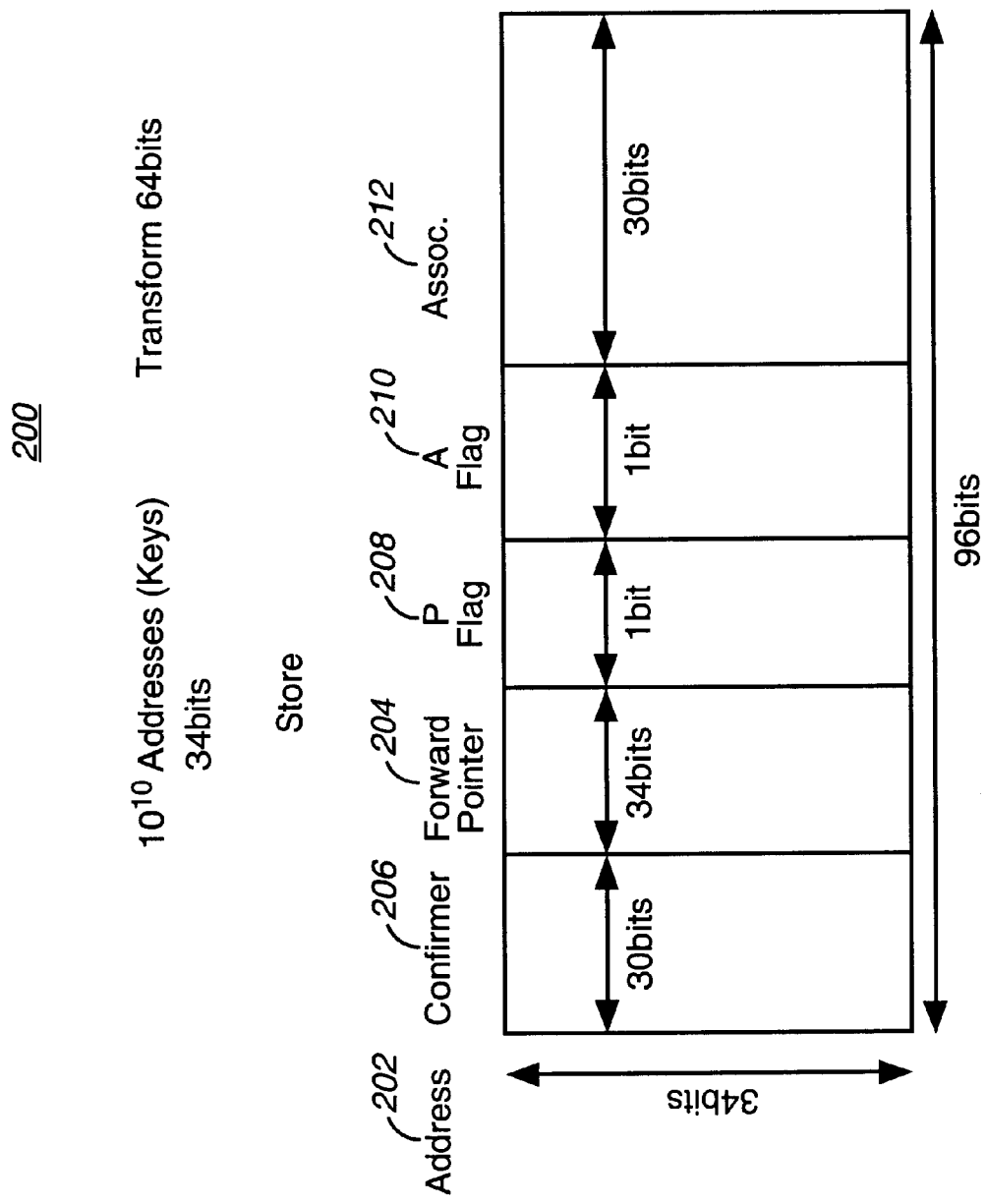
FIG. 10 is a schematic diagram of a memory store in accordance with one embodiment of the invention.

FIG. 9 is a schematic diagram of a memory store 200 in accordance with one embodiment of the invention. FIGS. 9 & 10 illustrate the versatility of the store to handle different numbers of entries. FIG. 9 shows an example of a store of the memory management system, when the required number of entries (addresses) is 100 Million. The system uses a transform that has sixty-four bits (first number of bits). A portion of the sixty-four bits is used as the address and the other portion is used as the confirmer. In this case the controller determines that the required number of entries requires an address 202 having an address number of bits equal to 27 bits. The forward pointer location 204 is set to have a forward pointer number of bits (twenty-seven) equal to the address number of bits. The confirmer location 206 is set to have a confirmer number of bits equal (thirty-seven) to the first number of bits (sixty-four—transform) less the forward pointer number of bits (twenty-seven). Note that the transform has to be large enough to cover the required number of entries. Ideally, the transform will be large enough (range of numbers) to cover more than the required number of entries. The primary flag location 208 and the allocation flag location 210 each requires one bit. The association 212 is optional, but in this example is shown as having thirty bits. Note that just to list all the potential transforms would require sixty-four bits. The store 200 without the optional association only requires sixty-six bits to store the entries or two more bits than listing all the transforms.

FIG. 10 is a schematic diagram of a memory store 200 in accordance with one embodiment of the invention. In this example, the store 200 needs to be able to handle 10 billion entries. As a result the address 202 is thirty-four bits. The forward pointer 204 is also set to thirty-four bits. The confirmer 206 is therefore set to have thirty bits. The size of the confirmer and forward pointer are traded to best accommodate and required number of entries. Note that the overall store is still ninety-six bits wide.

Thus there has been described a memory management system that only requires two bits more than just listing the transform. The memory management system is capable trading the confirmer size and forward pointer size to accommodate almost any number or entries.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of operating a memory management system, comprising the steps of:
   (a) specifying a store having a plurality of addresses;
   (b) defining a confirmer location for each of the plurality of addresses;
   (c) defining a forward pointer location for each of the plurality of addresses;
   (d) entering a forward address pointer in the forward pointer location for each of the plurality of address;
   (e) defining a primary flag for each of the plurality of addresses;
   (f) defining an allocated flag for each of the plurality of addresses;
   (g) defining an association for each of the plurality of addresses; and
   (h) entering a reverse address pointer in a free location for each of the plurality of addresses.

2. The method of claim 1, further including the steps of:
   (i) receiving a key for storage;

(j) performing a transform on the key to determine one of the plurality of addresses and a confirmer;

(k) determining if the allocated flag is set for the one of the plurality of addresses;

(l) when the allocated flag is not set, moving to a reverse address indicated by the reverse pointer address;

(m) updating the forward pointer address at the reverse address to equal the forward pointer address at the one of the plurality of addresses.

3. The method of claim 2, further including the steps of:

(n) moving to a forward address indicated by the forward pointer address;

(o) updating the reverse pointer address at the forward address to equal the reverse pointer address at the one of the plurality of addresses.

4. The method of claim 3, further including the steps of:

(p) entering the confirmer for the key at the confirmer location for the one of the plurality of addresses;

(q) setting the forward pointer address at the one of the plurality of addresses to the one of the plurality of addresses;

(r) setting the allocated flag for the one of the plurality of addresses;

(s) setting the primary flag for the one of the plurality of addresses.

5. The method of claim 2, further including the steps of:

(n) when the allocated flag is set for the one of the plurality of addresses, determining if the primary flag is set for the one of the plurality of addresses;

(o) when the primary flag is set, moving to a next address;

(p) determining if the allocated flag is set at the next address;

(q) when the allocated flag at the next address is not set, entering the confirmer in the confirmer location of the next address;

(r) setting the forward pointer address of the next address equal to the one of the plurality of addresses;

(s) setting the allocated flag at the next address.

6. The method of claim 5, further including the step of:

(t) setting the forward pointer address of the one of the plurality of addresses to the next address.

7. The method of claim 5, wherein step (q) further includes the steps of:

(q1) moving to a reverse address indicated by the reverse pointer address of the next address;

(q2) updating the forward pointer address at the reverse address to equal the forward pointer address at the next address;

(q3) moving to a forward address indicated by the forward pointer address of the next address;

(q4) updating the reverse pointer address at the forward address to equal the reverse pointer address at the next address.

8. The method of claim 5, further including the steps of:

(t) when the primary flag is not set for the one of the plurality of addresses, finding a free address;

(u) moving a first confirmer from the one of the plurality of addresses to the confirmer location of the free address;

(v) setting the forward pointer of the free address equal to the forward pointer for the one of the plurality of addresses;

(w) setting the allocated flag for the free address.

9. The method of claim 8, further including the steps of:

(x) entering the confirmer in the confirmer location of the one of the plurality of addresses;

(y) setting the forward pointer of the one of the plurality of addresses equal to the one of the plurality of addresses;

(z) setting the primary flag.

10. A memory management system comprising:

a transform generator capable of generating an address and a confirmer from a key;

a controller connected to the transform generator and sending the key to the transform generator and receiving the address and the confirmer; and a store connected to the controller having a plurality of addresses, each of the plurality of addresses having a confirmer location, a forward pointer location, a primary flag, an allocated flag and an association location.

11. The memory management system of claim 10, wherein a free list of addresses includes a reverse pointer in one of the confirmer location, the association location or primary flag of each of the free list of addresses and a forward pointer in the forward pointer location of each of the free list of addresses.

12. The memory management system of claim 11, wherein the controller has the transform generator determine a first address and a first confirmer upon receiving a first key.

13. The memory management system of claim 12, wherein the controller determines if an allocated flag is set at the first address when the controller receives a lookup command, when the allocated flag is set, the controller determines if the primary flag is set, the controller compares the first confirmer to a stored confirmer at the first address, when the first confirmer and the stored confirmer are the same, the controller reads a stored association at the first address.

14. A method of operating a memory management system, comprising the steps of:

(a) receiving a key and a command;

(b) when the command is a lookup command, determining a lookup confirmer and a lookup address from the key;

(c) determining if an allocated flag is set at the lookup address of a store;

(d) when the allocated flag is set, comparing the lookup confirmer with the stored confirmer at the lookup address; and (e) when the lookup confirmer and the stored confirmer match, reading an association at the lookup address.

15. The method of claim 14, further including the steps of:

(f) when the lookup confirmer and the stored confirmer are not the same, moving to a second address pointed to by the forward pointer at the lookup address;

(g) determining if a second confirmer at the second address is the same as the lookup confirmer;

(h) when the second confirmer and the lookup confirmer are the same, reading an association at the second address.

16. The method of claim 14, further including the steps of:

(f) when the command is a delete command, determining a delete address and a delete confirmer using the key;

(g) comparing a stored confirmer at the delete address to the delete confirmer;

(h) when the stored confirmer is the same as the delete confirmer, deleting the stored confirmer and the stored association at the delete address.

17. The method of claim 16, further including the steps of:
(i) unsetting the allocated flag and the primary flag.

18. The method of claim 17, further including the steps of:
(j) searching for a next free address having an unset allocated flag;
(k) setting a forward pointer at the delete address equal to the next free address;
(l) setting the confirmer of the delete address equal to the reverse pointer at the next free address;
(m) setting a confirmer at the next free address equal to the delete address;
(n) moving to a previous free address using the confirmer at the delete address;
(o) setting a forward pointer at the previous address equal to the delete address.

19. The method of claim 14, further including the steps of:
(f) when the command is a store command, determining a store address and a store confirmer using the key;
(g) determining if an allocated flag is set at the store address;
(h) when the allocated flag is not set at the store address, storing the store confirmer at a confirmer location for the store address;
(i) storing an association in an association location for the store address;
(j) setting the allocated flag for the store address;
(k) setting the primary flag for the store address.

20. The method of claim 19, further including the step of:
(l) setting a forward pointer at the store address equal to the store address.

21. The method of claim 20, wherein step (h) further includes the steps of:
(h1) moving to a reverse address indicated by the reverse pointer address at the store address;
(h2) updating the forward pointer address at the reverse address to equal the forward pointer address at the store address;
(h3) moving to a forward address indicated by the forward pointer address at the store address;
(h4) updating the reverse pointer address at the forward address to equal the reverse pointer address at the store address.

22. The method of claim 19, further including the steps of:
(l) when the allocated flag is set at the store address, determining if a primary flag is set;
(m) when the primary flag is set, moving to a next free address;
(n) setting a forward pointer at the store address equal to the next free address;
(o) moving to a reverse address pointed to by a reverse address pointer at the next free address;
(p) setting a forward pointer address at the reverse address equal to a forward pointer address at the next free address;
(q) moving to a forward address pointed to by a forward address pointer at the next free address;
(r) setting a reverse pointer address at the forward address equal to a reverse pointer address at the next free address.

23. The method of claim 19, further including the steps of:
(l) storing the store confirmer at a confirmer location for the next free address;
(m) storing an association in an association location for the next free address;
(n) setting the allocated flag for the next free address.

24. The method of claim 22, further including the steps of:
(s) when the primary flag is not set at the store address, determining a next free address;
(t) moving to the reverse address pointed to by the reverse address pointer at the next free address;
(u) setting the forward pointer address at the reverse address equal to the forward pointer address at the next free address;
(v) moving to the forward address pointed to by the forward address pointer at the next free address;
(w) setting the reverse pointer address at the forward address equal to the reverse pointer address at the next free address.

25. The method of claim 24, further including the steps of:
(x) setting a forward pointer address at a primary address pointed to by the forward pointer address of the store address equal to the next free address;
(y) setting a confirmer at the next free address equal to a stored confirmer at the store address;
(z) setting a forward pointer at the next free address equal to the forward pointer address at the store address;
(aa) setting an allocated flag at the next free address.

26. The method of claim 25, further including the steps of:
(ab) storing a store confirmer in a confirmer location of the store address;
(ac) setting the forward pointer at the store address equal to the store address;
(ad) setting the allocated flag and the primary flag at the store address;
(ae) storing the store association in an association location of the store address.

27. A method of operating a memory management system, comprising the steps of:
(a) determining a number of required entries;
(b) selecting a transform having a first number of bits;
(c) determining an address number of bits required to cover all the number of required entries;
(d) setting a forward pointer number of bits equal to the address number of bits; and
(e) setting a confirmer number of bits equal to the first number of bits less the forward pointer number of bits.

28. The method of claim 27, wherein a range of numbers defined by the first number of bits is greater than the number of required entries.

29. The method of claim 27, further including the steps of:
(f) entering a forward address pointer in a forward pointer location;
(g) entering a reverse address pointer in a free location.

30. The method of claim 29, further including the step of:
(h) defining a primary flag for each of a plurality of addresses;
(i) defining an allocated flag for each of the plurality of addresses.

31. The method of claim 30, further including setting the allocated flag to an unallocated state.

32. A memory management system comprising:
a transform generator capable of generating an address and a confirmer from a key;
a controller connected to the transform generator and sending the key to the transform generator and receiving the address and the confirmer; and a store having a plurality of addresses, each of the plurality of addresses having a confirmer location, a forward pointer location, a primary flag, and an allocated flag.

33. The memory management system of claim 32 wherein a number of address bits is equal to a number of confirmer bits plus a number of forward pointer bits.

34. A method of operating a memory management system, comprising the steps of:

(a) receiving a key and a write command;

(b) determining a lookup address from the key;

(c) determining if a primary flag is set at the lookup address of the store; and (d) when the primary flag is not set and an allocated flag is set, moving an entry at the lookup address to a next free address.

35. The method of claim 34, further including the step of:

(e) storing a lookup confirmer at the lookup address.

36. The method of claim 35, further including the step of:

(f) setting a primary flag at the lookup address.

* * * * *